United States Patent
Okamoto et al.

(10) Patent No.: US 10,097,683 B2
(45) Date of Patent: Oct. 9, 2018

(54) MOBILE ELECTRONIC DEVICE, SECURITY CONTROL METHOD, AND SECURITY CONTROL CODE

(71) Applicant: KYOCERA Corporation, Kyoto-shi, Kyoto (JP)

(72) Inventors: Katsuhiro Okamoto, Setagaya-ku (JP); Haruyoshi Oshinome, Nagaokakyo (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/489,871

(22) Filed: Apr. 18, 2017

(65) Prior Publication Data

US 2017/0302784 A1    Oct. 19, 2017

(30) Foreign Application Priority Data

Apr. 18, 2016  (JP) ................................ 2016-083151

(51) Int. Cl.
| | |
|---|---|
| H04M 1/673 | (2006.01) |
| H04M 1/725 | (2006.01) |
| H04W 12/06 | (2009.01) |
| G06F 21/31 | (2013.01) |
| G06F 21/32 | (2013.01) |
| G06F 21/74 | (2013.01) |
| H04W 4/02 | (2018.01) |

(52) U.S. Cl.
CPC ........ *H04M 1/72577* (2013.01); *G06F 21/31* (2013.01); *G06F 21/32* (2013.01); *G06F 21/74* (2013.01); *H04M 1/673* (2013.01); *H04M 1/72569* (2013.01); *H04M 1/72572* (2013.01); *H04W 4/025* (2013.01); *H04W 12/06* (2013.01)

(58) Field of Classification Search
CPC .............................. H04M 1/673; G06F 21/32
USPC ........ 455/550.1, 552.1, 67.11, 551, 410, 411
See application file for complete search history.

(56) References Cited

U.S. PATENT DOCUMENTS

| | | | |
|---|---|---|---|
| 6,151,493 A | 11/2000 | Sasakura et al. | |
| 2013/0063611 A1* | 3/2013 | Papakipos ............. | G06F 1/1686 348/207.11 |
| 2016/0006860 A1* | 1/2016 | Neitzel ............. | H04M 1/72577 455/419 |

FOREIGN PATENT DOCUMENTS

JP    11-88499 A    3/1999

OTHER PUBLICATIONS

Extended European Search Report in EP Application No. 17166838.7, dated Sep. 12, 2017, 9pp.

* cited by examiner

*Primary Examiner* — John J Lee
(74) *Attorney, Agent, or Firm* — Hauptman Ham, LLP

(57) ABSTRACT

A mobile electronic device includes an acceleration sensor configured to detect an acceleration value, a controller configured to determine, based on the acceleration value, movement state of user of the mobile electronic device, a first input unit configured to receive input of information enabling unlocking of a security lock state in which a security lock is effective, and a second input unit configured to receive input of biological information enabling unlocking of the security lock state.

9 Claims, 4 Drawing Sheets

MOBILE ELECTRONIC DEVICE, SECURITY CONTROL METHOD, AND SECURITY CONTROL CODE

CROSS-REFERENCE TO RELATED APPLICATION(S)

The present application claims priority to and incorporates by reference the entire contents of Japanese Patent Application No. 2016-083151 filed in Japan on Apr. 18, 2016.

BACKGROUND

1. Field

The present application relates to a mobile electronic device, a security control method, and a security control code.

2. Description of the Related Art

Conventionally, in a mobile electronic device such as a smartphone, with the aim of preventing erroneous operations and preventing abuse from a third party, a function (hereinafter, called a security lock) is installed for restricting the operations of the mobile electronic device.

SUMMARY

A mobile electronic device according to one aspect includes an acceleration sensor configured to detect an acceleration value, a controller configured to determine, based on the acceleration value, movement state of user of the mobile electronic device, a first input unit configured to receive input of information enabling unlocking of a security lock state in which a security lock is effective, and a second input unit configured to receive input of biological information enabling unlocking of the security lock state. When it is determined based on the acceleration value that the user is not moving, the controller permits both unlocking of the security lock state based on information input via the first input unit and unlocking of the security lock state based on information input via the second input unit. When it is determined based on the acceleration value that the user is moving, the controller prohibits unlocking of the security lock state based on information input via the first input unit and permits only unlocking of the security lock state based on information input via the second input unit.

A security control method according to one aspect is executed by a mobile electronic device that includes an acceleration sensor configured to detect an acceleration value, a first input unit configured to receive input of information enabling unlocking of a security lock state in which a security lock is effective, and a second input unit configured to receive input of biological information enabling unlocking of the security lock state. The security control method includes the step of determining, based on the acceleration value, movement state of user of the mobile electronic device. The security control method includes the step of permitting, when it is determined based on the acceleration value that the user is not moving, both unlocking of the security lock state based on information input via the first input unit and unlocking of the security lock state based on information input via the second input unit. The security control method includes the step of prohibiting, when it is determined based on the acceleration value that the user is moving, unlocking of the security lock state based on information input via the first input unit and permitting only unlocking of the security lock state based only on information input via the second input unit.

A non-transitory storage medium according to one aspect stores thereon a security control code for causing a mobile electronic device including an acceleration sensor configured to detect an acceleration value, a first input unit configured to receive input of information enabling unlocking of a security lock state in which a security lock is effective, and a second input unit configured to receive input of biological information enabling unlocking of the security lock state to execute the following steps. The security control code causes the mobile electronic device to execute the step of determining, based on the acceleration value, movement state of user of the mobile electronic device. The security control code causes the mobile electronic device to execute the step of permitting, when it is determined based on the acceleration value that the user is not moving, both unlocking of the security lock state based on information input via the first input unit and unlocking of the security lock state based on information input via the second input unit. The security control code causes the mobile electronic device to execute the step of prohibiting, when it is determined based on the acceleration value that the user is moving, unlocking of the security lock state based on information input via the first input unit and permitting only unlocking of the security lock state based only on information input via the second input unit.

DETAILED DESCRIPTION

Figure 1:
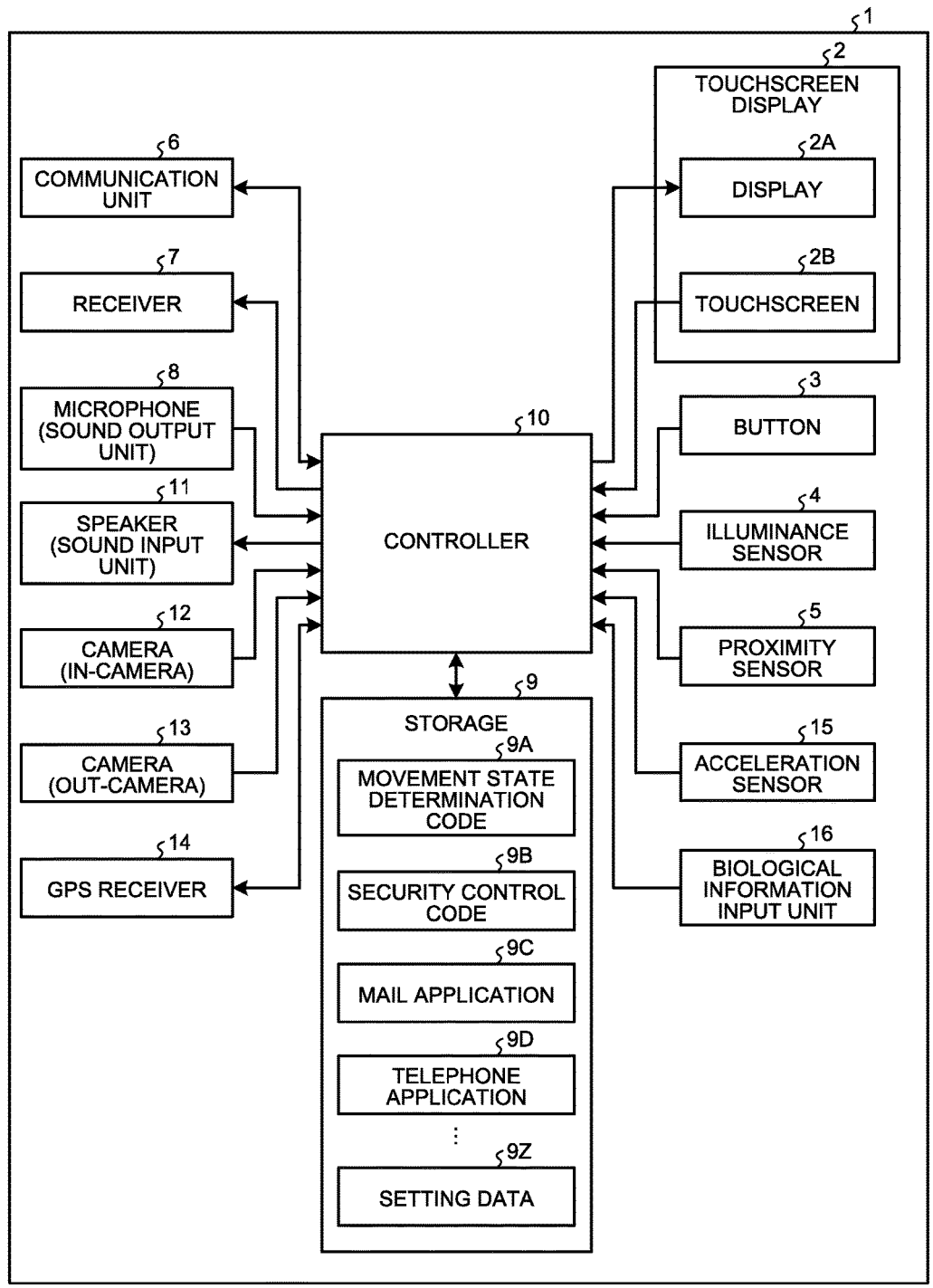
FIG. 1 is a block diagram illustrating a functional configuration of a smartphone according to embodiments.

There is room for improvement with regard to an unlocking sequence for unlocking a security lock state in which the abovementioned security lock is effective. A plurality of embodiments of a mobile electronic device, a security control method, and a security control code according to the present application are described below in detail with reference to the accompanying drawings. The following explanation is given for a smartphone representing an example of the mobile electronic device according to the present application. In the following explanation, identical constituent elements are referred to by the same reference numerals. Moreover, redundant explanation is not repeated.

Explained below with reference to FIG. 1 is an exemplary functional configuration of a smartphone 1 according to a plurality of embodiments. FIG. 1 is a block diagram illustrating a functional configuration of the smartphone 1.

As illustrated in FIG. 1, the smartphone 1 includes a touchscreen display 2, one or more buttons 3, an illuminance sensor 4, a proximity sensor 5, a communication unit 6, a receiver 7, a microphone 8, a storage 9, a controller 10, a speaker 11, cameras 12 and 13, a GPS receiver 14, an acceleration sensor 15, and a biological information input unit 16. In the following explanation, the smartphone 1 is sometimes referred to as the "own device".

The touchscreen display 2 includes a display 2A and a touchscreen 2B. Herein, for example, the display 2A and the touchscreen 2B can be positioned in an overlapping manner, or can be positioned alongside each other, or can be positioned at a distance from each other. If the display 2A and the touchscreen 2B are positioned in an overlapping manner, for example, one or more sides of the display 2A need not be parallel to any side of the touchscreen 2B.

The display 2A includes a display device such as a liquid crystal display (LCD), an organic electro-luminescence display (OELD), or an inorganic electro-luminescence display (IELD). The display 2A is capable of displaying objects such as characters, images, symbols, and diagrams in a screen. The screens in which objects such as characters, images, symbols, and diagrams are displayed by the display 2A can be a screen called a lock screen, a screen called a home screen, and an application screen that is displayed during the execution of an application. The home screen is also called a desktop, a standby screen, an idle screen, a standard screen, an application list screen, or a launcher screen.

The touchscreen 2B is capable of detecting contact or proximity with respect to itself of one or more fingers, one or more pens, or one or more stylus pens. When contact or proximity of one or more fingers, one or more pens, or one or more stylus pens with respect to itself is detected; the touchscreen 2B is capable of detecting the position of contact or proximity on itself. A finger, or a pen, or a stylus pen detected by the touchscreen 2B is sometimes written as "finger". The position of contact or proximity by the finger detected by the touchscreen 2B is sometimes written as "detection position". The touchscreen 2B can notify the controller 10 about a contact of a finger with respect to itself and about the detection position. The operations implementable by the touchscreen 2B can be performed by the touchscreen display 2 that includes the touchscreen 2B. In other words, the operations of the touchscreen 2B may be performed by the touchscreen display 2. An operation with respect to the touchscreen 2B can, in other words, be said as an operation with respect to the touchscreen display 2 that includes the touchscreen 2B. Alternatively, an operation with respect to the touchscreen 2B can, in other words, be said as an operation with respect to the smartphone 1 that includes the touchscreen 2B. In some embodiments, the touchscreen 2B can appropriately implement the electrostatic capacitance method, the resistive method, or the load sensing method as the detection method. In the embodiments, the touchscreen 2B represents an example of a first input unit.

The controller 10 is capable of determining the type of gesture based on at least one of the following: the number of contacts detected by the touchscreen 2B, the position at which a contact is detected, a change in the position at which a contact is detected, the temporal length for which a contact is detected, the temporal interval at which contacts are detected, and the number of times for which a contact is detected. The operations implementable by the controller 10 can be performed by the smartphone 1 that includes the controller 10. In other words, the operations of the controller 10 may be performed by the smartphone 1. Meanwhile, a gesture represents an operation performed with respect to the touchscreen 2B using a finger. An operation performed with respect to the touchscreen 2B can be performed also with respect to the touchscreen display 2 that includes the touchscreen 2B. Examples of the gesture determined by the controller 10 via the touchscreen 2B include, but are not limited to, a touch, a long touch, a release, a swipe, a tap, a double tap, a long tap, a drag, a flick, pinching in, and pinching out. However, a gesture is not limited to those examples.

The button 3 receives an operation input from the user. Upon receiving an operation input from the user, the button 3 notifies the controller 10 about the reception of an operation input. Meanwhile, there can be a single button 3 or there can be more than one buttons 3. Moreover, the button 3 can include a numeric keypad or QWERTY keys. In the embodiments, the button 3 represents an example of the first input unit.

The illuminance sensor 4 is capable of detecting illuminance. Herein, the illuminance represents the value of the luminous flux incident on the unit area of a measurement surface of the illuminance sensor 4. Moreover, for example, the illuminance sensor 4 can also be used in adjusting the luminance of the display 2A.

The proximity sensor 5 is capable of performing contactless detection of the presence of a nearby object. Herein, the proximity sensor 5 can detect the presence of an object based on a change in the magnetic field, a change in the feedback time of the reflected waves of ultrasonic waves, or the like. Moreover, for example, the proximity sensor 5 can also be used in detecting that the face of a user has come close to the display 2A. Meanwhile, the illuminance sensor 4 and the proximity sensor 5 can be configured as a single sensor. Alternatively, the illuminance sensor 4 can be used as a proximity sensor too.

The communication unit 6 is capable of performing wireless communication. The communication unit 6 supports a wireless communication standard. Examples of the wireless communication standard supported by the communication unit 6 include, but are not limited to, a cellular phone communication standard such as 2G, 3G, or 4G; and a short-distance wireless communication standard. Examples of the cellular phone communication standard include, but are not limited to, the LTE standard (LTE stands for Long Term Evolution), the W-CDMA standard (W-CDMA stands for Wideband Code Division Multiple Access), the WiMAX (registered trademark) standard (WiMAX stands for Worldwide Interoperability for Microwave Access), the CDMA2000 standard, the PDC standard (PDC stands for Personal Digital Cellular), the GSM (registered trademark) standard (GSM stands for Global System for Mobile Communications), and the PHS standard (PHS stands for Personal Handy-phone System). Examples of the short-distance wireless communication standard include, but are not limited to, the IEEE 802.11 standard (IEEE stands for The Institute of Electrical and Electronics Engineers, Inc.), Bluetooth (registered trademark), the IrDA standard (IrDA stands for Infrared Data Association), the NFC standard (NFC stands for Near Field Communication), and the WPAN standard (WPAN stands for Wireless Personal Area Network). Moreover, examples of the WPAN standard include, but are not limited to, ZigBee (registered trademark), the DECT standard (DECT stands for Digital Enhanced Cordless Telecommunications), Z-Wave, and the WiSun standard (WiSun stands for Wireless Smart Utility Network). The communication unit 6 can support one or more of such communication standards.

The receiver 7 is capable of outputting sound signals, which are transmitted from the controller 10, as sound. For example, the receiver 7 can output the sound of videos played in the smartphone 1, the sound of music played in the smartphone 1, and the voice of the person on the other side of a telephone call. The microphone 8 converts the voice of the user and the like into sound signals and transmits the sound signals to the controller 10. In the embodiments, the microphone 8 represents an example of a second input unit.

The storage 9 is capable of storing computer codes and data. The storage 9 can also be used as the work area for temporarily storing the processing result of the controller 10. The storage 9 can include an arbitrary non-transitory memory medium such as a semiconductor memory medium and a magnetic memory medium. Alternatively, the storage 9 can include a plurality of types of memory medium. Still alternatively, the storage 9 can include a combination of a memory medium such as a memory card, or an optical disk, or a magneto-optical disk with a reading device for the memory medium. Still alternatively, the storage 9 can include a memory device such as a random access memory (RAM) that is used as a temporary memory area.

The computer codes stored in the storage 9 include applications executed either in the foreground or in the background, and base codes that support the operations of the applications. For example, when an application is executed in the foreground, the screen of that application is displayed on the display 2A. The base codes include an operating system (OS), for example. The applications and the base codes can be installed in the storage 9 either using the wireless communication performed by the communication unit 6 or via a non-transitory memory medium.

The storage 9 can be used to store, for example, a movement state determination code 9A, a security control code 9B, a mail application 9C, a telephone application 9D, and setting data 9Z.

The movement state determination code 9A can provide a function for determining the movement state of the user of the own device based on acceleration values. More particularly, based on the direction and the magnitude of acceleration as obtained by the acceleration sensor 15, the movement state determination code 9A measures the vibrations and the motion acting on the own device. Then, the movement state determination code 9A compares the measurement result of the vibrations and the motion acting on the own device with reference data related to the vibrations and the motion acting on the own device in various movement states, and accordingly determines the movement state of the user of the own device. Herein, movement states include states in which the user is not moving and states in which the user is moving. The states in which the user is not moving include a state in which the own device is placed on a stationary object and a halting state in which the user who is carrying the own device has halted. The states in which the user is moving include a walking state in which the user who is carrying the smartphone 1 is walking, a running state in which the user who is carrying the smartphone 1 is running, and a riding state in which the user who is carrying the smartphone 1 is riding a bicycle, an automobile, or a train.

The security control code 9B can provide a function for unlocking a security lock state in which the security lock is effective. More particularly, if it is determined that the user is not moving, then the security control code 9B permits both unlocking of the security lock state based on the information input via the touchscreen 2B, the button 3, and the like and unlocking of the security lock state based on biological information input via the biological information input unit 16. On the other hand, if it is determined that the user is moving, then the security control code 9B prohibits unlocking of the security lock state based on the information input via the touchscreen 2B, the button 3, and the like and permits only unlocking of the security lock state based on biological information input via the biological information input unit 16.

The mail application 9C can provide an e-mail function for composition, transmission, reception, display, and the like of an e-mail. The telephone application 9D can provide a calling function for making a telephone call using wireless communication.

The setting data 9Z is made of a variety of data used in the operations of the smartphone 1. The setting data 9Z contains information enabling determination of whether or not the own device is in a moving state. Moreover, the setting data 9Z contains reference data related to the vibrations and the motion acting on the own device in each movement state. The reference data related to the vibrations and the motion acting on the own device in each movement state can contain the direction and the magnitude of acceleration acting on the smartphone 1, or can contain an acceleration pattern made of time-series variation in the direction and the magnitude of acceleration. Furthermore, the setting data 9Z contains biological authentication information that is used in authenticating the biological information input via the biological information input unit 16. The biological information can contain information related to the face, fingerprints, ear prints, the vein pattern, the iris, the retina, and the voiceprint.

The controller 10 can integrally control the operations of the smartphone 1 and implement various functions. The controller 10 includes a processing device, examples of which include, but are not limited to, a central processing unit (CPU), a System-on-a-Chip (SoC), a micro control unit (MCU), a field-programmable gate array (FPGA), and a coprocessor. However, the controller 10 is not limited to those examples. The SoC can have other constituent elements such as the communication unit 6 integrated therein. Meanwhile, the controller 10 is an example of a controller.

More particularly, the controller 10 executes instructions specified in the computer codes, which are stored in the storage 9, while referring to the data, which is stored in the storage 9, as may be necessary. The controller 10 controls the functional units according to the data and the instructions, and as a result implements various functions. The functional units include at least one of the display 2A, the communication unit 6, the microphone 8, the speaker 11, and the GPS receiver 14. However, those are not the only possible examples. The controller 10 sometimes alters the control according to the detection result of detector. For example, the detector includes at least one of the touchscreen 2B, the button 3, the illuminance sensor 4, the proximity sensor 5, the microphone 8, the cameras 12 and 13, the acceleration sensor 15, and the biological information input unit 16. However, those are not the only possible examples.

The controller 10 executes the movement state determination code 9A and performs the following various operations in cooperation with the acceleration sensor 15. Based on the direction and the magnitude of acceleration as obtained from the acceleration sensor 15, the controller 10 measures the vibrations and the motion acting on the own device. Then, the controller 10 compares the measurement result of the vibrations and the motion acting on the own device with the reference data related to the vibrations and the motion acting on the own device in each movement state, and accordingly determines the movement state of the user of the own device.

The controller 10 executes the security control code 9B and performs the following various operations. From the processing result of the movement state determination code 9A, if it is determined that the user is not moving, then the controller 10 permits both unlocking of the security lock state based on the information input via the touchscreen 2B, the button 3, and the like and unlocking of the security lock state based on biological information input via the biological information input unit 16. On the other hand, from the processing result of the movement state determination code 9A, if it is determined that the user is moving, then the controller 10 does prohibits unlocking of the security lock state based on the information input via the touchscreen 2B and the button 3 and permits only unlocking of the security lock state based on biological information input via the biological information input unit 16.

The speaker 11 can output the sound signals, which are transmitted from the controller 10, as sound. For example, the speaker 11 can output the ringtone or music. Meanwhile, either the receiver 7 can have the function of the speaker 11, or the speaker 11 can have the function of the receiver 7.

The cameras 12 and 13 can convert a taken image into an electric signal. The camera 12 can be an in-camera that captures an object facing the display 2A. The camera 13 can be an out-camera that captures an object facing the opposite face to the display 2A. Meanwhile, the cameras 12 and 13 can be installed in the smartphone 1 in a functionally-and-physically integrated state as a camera unit in which the in-camera and the out-camera can be switched between the cameras 12 and 13.

The GPS receiver 14 can receive radio signals of a predetermined frequency band from a GPS satellite. Then, the GPS receiver 14 performs demodulation of the received radio signals and sends the demodulated signals to the controller 10. The GPS receiver 14 supports the operation of computing the current location of the smartphone 1.

The acceleration sensor 15 detects the direction and the magnitude of acceleration (acceleration value) acting on the own device. The controller 10 can determine the movement state of the user of the own device based on the direction and the magnitude of acceleration detected by the acceleration sensor 15 or based on the acceleration pattern including the time-series variation in the direction and the magnitude of acceleration.

The biological information input unit 16 receives biological information to be used in unlocking the security lock state. For example, the biological information input unit 16 can be configured as a unit including sensors for incorporating biological information such as a fingerprint sensor for incorporating fingerprint data, an ear print sensor for incorporating ear print data, and a vein pattern sensor for incorporating vein pattern data. Alternatively, the biological information input unit 16 can extract, from a face image taken by the camera 12, the feature points of the face, the iris, and the retina; and incorporate the extracted information as biological information. Still alternatively, the biological information input unit 16 can incorporate, as biological information, the frequency pattern of the voice input from the microphone 8.

The controller 10 can use the output of the acceleration sensor 15 in combination with the output of other sensors (not illustrated) such as a direction sensor. As a result of using the output of the acceleration sensor 15 in combination with the output of other sensors; the smartphone 1 becomes able to perform, using the controller 10, control in which the motion of the own device is highly reflected. Meanwhile, the acceleration sensor 15 and the other sensors can be used as a single motion sensor.

The smartphone 1 can include, in addition to the functional units described above, a connector, a direction sensor, a vibrator, and the like. The connector includes a terminal for establishing connection with another device. The connector can include a versatile terminal such as a universal serial bus (USB), a high-definition multimedia interface (HDMI) (registered trademark), Light Peak (Thunderbolt (registered trademark)), or an earphone-microphone connector. Alternatively, the connector can be a dedicated terminal such as a Dock connector. Examples of the device that can be connected to the connector include, but are not limited to, an external storage, a speaker, and a communication device. However, those are not the only possible examples. The direction sensor can measure the geomagnetism, for example, and determine the orientation (azimuth direction) of the smartphone 1. The direction sensor can be a biaxial sensor or a triaxial sensor. The direction sensor can measure the orientation and the magnitude of the magnetic field. The vibrator causes the smartphone 1 to vibrate partially or entirely. In order to generate vibrations, the vibrator includes for example, a piezoelectric element or an eccentric motor. Meanwhile, the smartphone 1 also includes functional units, such as a battery, used by necessity for maintaining the functions of the smartphone 1, and includes control units used by necessity for implementing the control of the smartphone 1.

Figure 2:
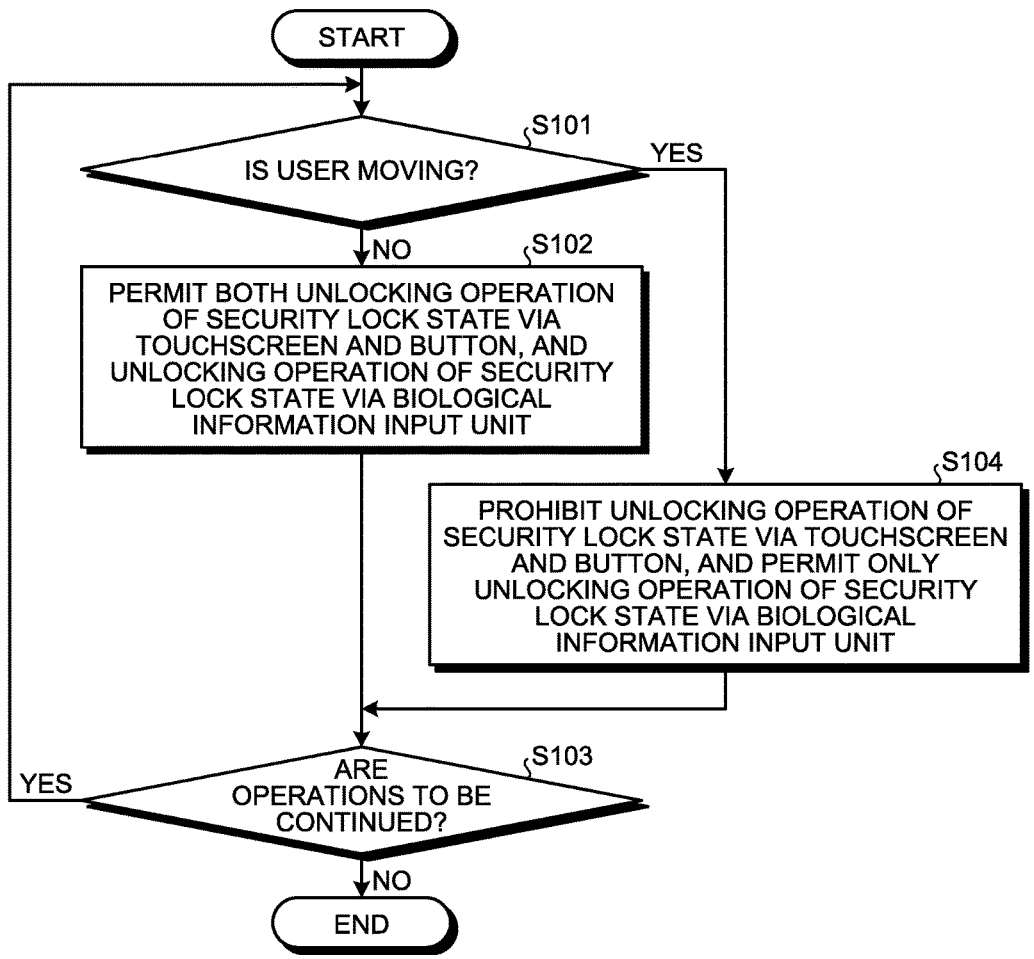
FIG. 2 is a flowchart for explaining an example of the operations performed by the smartphone according to the embodiments.

Explained below with reference to FIG. 2 is an example of the operations performed by the smartphone 1 according to the embodiments. FIG. 2 is a flowchart for explaining an example of the operations performed by the smartphone 1 according to the embodiments. The operations illustrated in FIG. 2 are implemented upon the execution of the movement state determination code 9A and the security control code 9B, which are stored in the storage 9, by the controller 10.

With reference to FIG. 2, the explanation is given about an exemplary flow of operations performed by the smartphone 1. As illustrated in FIG. 2, based on the acceleration value detected by the acceleration sensor 15, the controller 10 determines whether or not the user of the own device is moving (Step S101).

If it is determined that the user of the own device is not moving (No at Step S101), then the controller 10 permits both an unlocking operation of the security lock state via the touchscreen 2B and the button 3 and an unlocking operation of the security lock state via the biological information input unit 16 (Step S102).

Subsequently, the controller 10 determines whether or not to continue with the operations (Step S103).

If it is determined to continue with the operations (Yes at Step S103), then the controller 10 returns to the operation at Step S101.

On the other hand, if it is determined not to continue with the operations (No at Step S103), then the controller 10 ends the operations illustrated in FIG. 2.

Meanwhile, at Step S101, if it is determined that the user of the own device is moving (Yes at Step S101), then the controller 10 prohibits an unlocking operation of the security lock state via the touchscreen 2B and the button 3 and permits only an unlocking operation of the security lock state via the biological information input unit 16 (Step S104), and returns to the determination performed at Step S103.

As described above, when the user of the smartphone 1 is moving, it is highly probable that the user is out, and thus the intent behind prohibiting an unlocking operation of the security lock state via the touchscreen 2B and the button 3 is to avoid any danger to the user of the smartphone 1 such as collision with another person, a bicycle, an automobile, an obstacle, and the like due to the inattention caused by an input operation while the user is moving.

In the embodiments, the explanation is given about an example in which the operations related to the method of unlocking the security lock state of the smartphone 1 are performed according to the determination result of the movement state of the user of the smartphone 1. As other embodiments, given below is the explanation of an example in which, when the user of the own device is moving, the operations related to the method of unlocking the security lock state of the smartphone 1 are performed according to the current location of the user.

The security control code 9B can provide a function in which, when the user of the own device is moving, it is further determined whether or not the current location of the user of the own device is a predetermined location, and the operations related to the method of unlocking the security lock state are performed according to the determination result. More particularly, if the current location of the user of the own device is the predetermined location, then the security control code 9B permits both unlocking of the security lock state based on the information input via the touchscreen 2B, the button 3, and the like and unlocking of the security lock state based on biological information input via the biological information input unit 16. On the other hand, if the current location of the user of the own device is not the predetermined location, then the security control code 9B prohibits unlocking of the security lock state based on the information input via the touchscreen 2B, the button 3, and the like and permits only unlocking of the security lock state based on biological information input via the biological information input unit 16. Herein, the predetermined location is, for example, the location of the home in which the security need not be maintained at a high level. The predetermined location can be arbitrarily set by the user of the smartphone 1. If the home is set as the predetermined location; then the security control code 9B can determine whether or not the current location of the user points to the home based on whether or not a wireless LAN router (LAN stands for Local Area Network) installed in the home is detected, or can determine whether or not the current location of the user points to the home based on the signals of the GPS receiver 14.

As a result of executing the security control code 9B, the controller 10 determines whether or not the current location of the user of the own device points to the predetermined location, and performs the operations related to unlocking the security lock state according to the determination result. More particularly, when the user of the own device is not moving, if the determination of whether or not the current location of the user of the own device points to the predetermined location (for example, the home) indicates that the current location of the user points to the predetermined location, then the controller 10 permits both unlocking of the security lock state based on the information input via the touchscreen 2B, the button 3, and the like and unlocking of the security lock state based on biological information input via the biological information input unit 16. On the other hand, if the determination of whether or not the current location of the user of the own device points to the predetermined location (for example, the home) indicates that the current location of the user does not point to the predetermined location, then the controller 10 prohibits unlocking of the security lock state based on the information input via the touchscreen 2B, the button 3, and the like and permits only unlocking of the security lock state based on biological information input via the biological information input unit 16.

Figure 3:
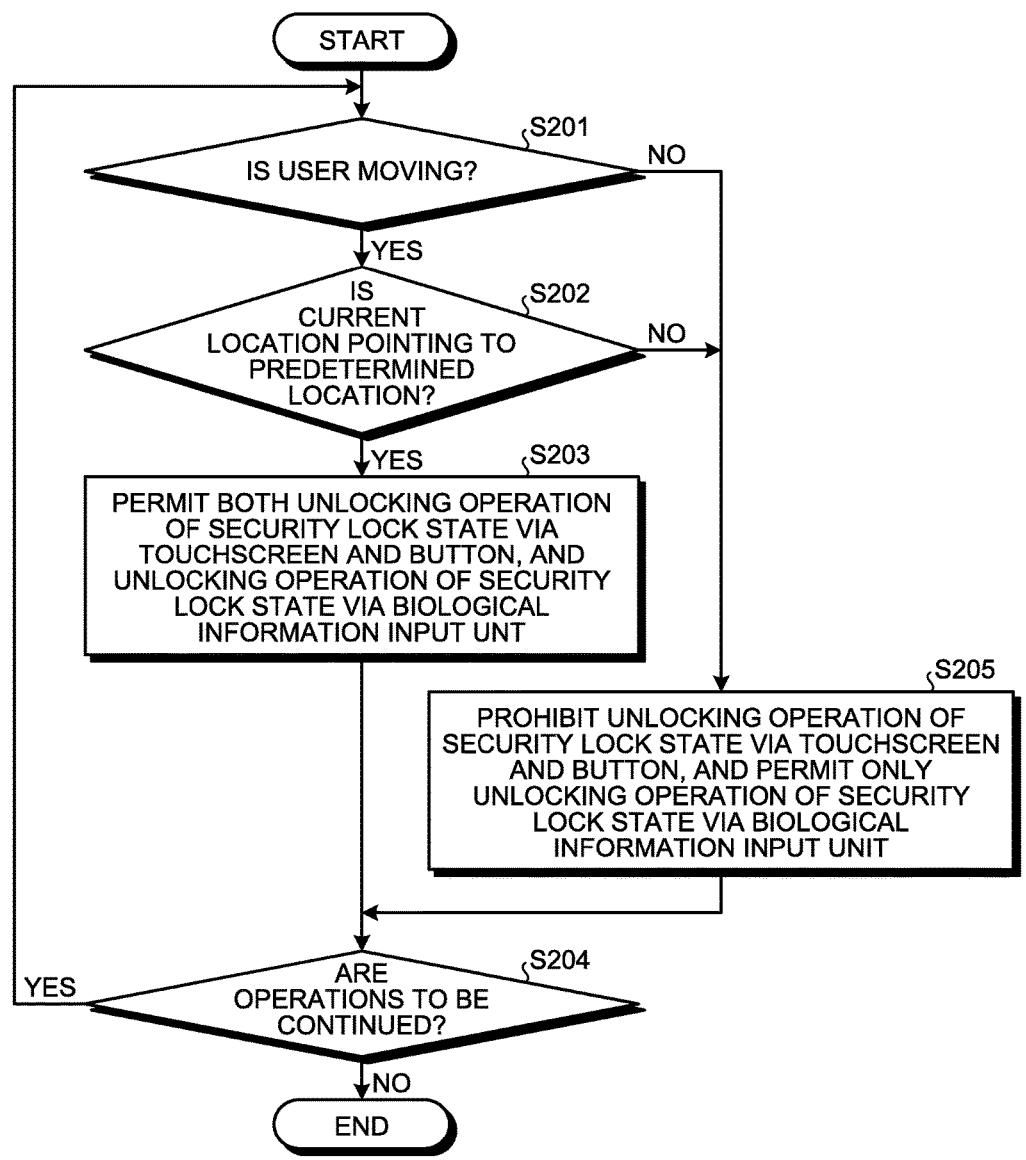
FIG. 3 is a flowchart for explaining an example of the operations performed by the smartphone according to other embodiments.

Explained below with reference to FIG. 3 is an exemplary flow of operations performed by the smartphone 1. FIG. 3 is a flowchart for explaining an example of the operations performed by the smartphone according to other embodiments.

As illustrated in FIG. 3, based on the acceleration value detected by the acceleration sensor 15, the controller 10 determines whether or not the user of the own device is moving (Step S201).

If it is determined that the user of the own device is moving (Yes at Step S201); then the controller 10 determines whether or not the current location of the user of the own device points to a predetermined location (Step S202).

If it is determined that the current location of the user of the own device points to the predetermined location (Yes at Step S202), then the controller 10 permits both an unlocking operation of the security lock state via the touchscreen 2B and the button 3 and an unlocking operation of the security lock state via the biological information input unit 16 (Step S203).

Subsequently, the controller 10 determines whether or not to continue with the operations (Step S204).

If it is determined to continue with the operations (Yes at Step S204), then the controller 10 returns to the operation at Step S201.

On the other hand, if it is determined not to continue with the operations (No at Step S204), then the controller 10 ends the operations illustrated in FIG. 3.

Meanwhile, at Step S201 described above, if it is determined that the own device is not moving (Yes at Step S201), then the controller 10 prohibits an unlocking operation of the security lock state via the touchscreen 2B and the button 3 and permits only an unlocking operation of the security lock state via the biological information input unit 16 (Step S205), and returns to the determination performed at Step S204.

Meanwhile, at Step S202, if it is determined that the current location of the user of the own device does not point to the predetermined location (No at Step S202), then the controller 10 proceeds to the operation at Step S205.

In this way, for example, when the user of the smartphone 1 is at home, the intent behind permitting an unlocking operation of the security lock state via the touchscreen 2B and the button 3 even if the user is moving is to give priority to convenience by taking into account the fact that there is less danger at home even during inattention caused by performing an input operation while the user is moving.

In the embodiments, the explanation is given about an example in which the operations related to the method of unlocking the security lock state of the smartphone 1 are performed according to the determination result of the movement state and the current location of the user of the smartphone 1. As other embodiments, given below is the description of an example in which the operations related to the method of unlocking the security lock state of the smartphone 1 are performed according to operation settings performed by the user of the smartphone 1.

The security control code 9B can provide a function for setting a bedtime operation control mode, which represents operation control settings of the own device corresponding to the bedtime of the user of the own device, in response to an operation performed by the user. The bedtime operation control mode represents settings by which, except for particular cases, the operations of the smartphone 1 are so controlled that basically the ringtone is not output and vibrations by the vibrator are not allowed. Examples of particular cases include, but are not limited to, an incoming call from the same telephone number from which a number of incoming calls equal to or greater than a predetermined count are received within a predetermined period of time, and incoming calls from particular telephone numbers. The security control code 9B can provide a function of determining whether or not the own device is set to the bedtime operation control mode and performing the operations related to the method of unlocking the security lock state of the own device according to the determination result. More particularly, if the bedtime operation control mode is set, the security control code 9B prohibits unlocking of the security lock state based on biological information input via the biological information input unit 16 and permits only unlocking of the security lock state based on the information input via the touchscreen 2B, the button 3, and the like. On the other hand, if the bedtime operation control mode is not set, the security control code 9B permits both unlocking of the security lock state based on biological information input via the biological information input unit 16 and unlocking of the security lock state based on the information input via the touchscreen 2B, the button 3, and the like.

As a result of executing the security control code 9B, the controller 10 determines whether or not the own device is set to the bedtime operation control mode and performs the operations related to the method of unlocking the security lock state of the own device according to the determination result. More particularly, if the bedtime operation control mode is set, the controller 10 prohibits unlocking of the security lock state based on biological information input via the biological information input unit 16 and permits only unlocking of the security lock state based on the information input via the touchscreen 2B and the button 3. On the other hand, if the bedtime operation control mode is not set, the controller 10 permits both unlocking of the security lock state based on biological information input via the biological information input unit 16 and unlocking of the security lock state based on the information input via the touchscreen 2B, the button 3, and the like.

Figure 4:
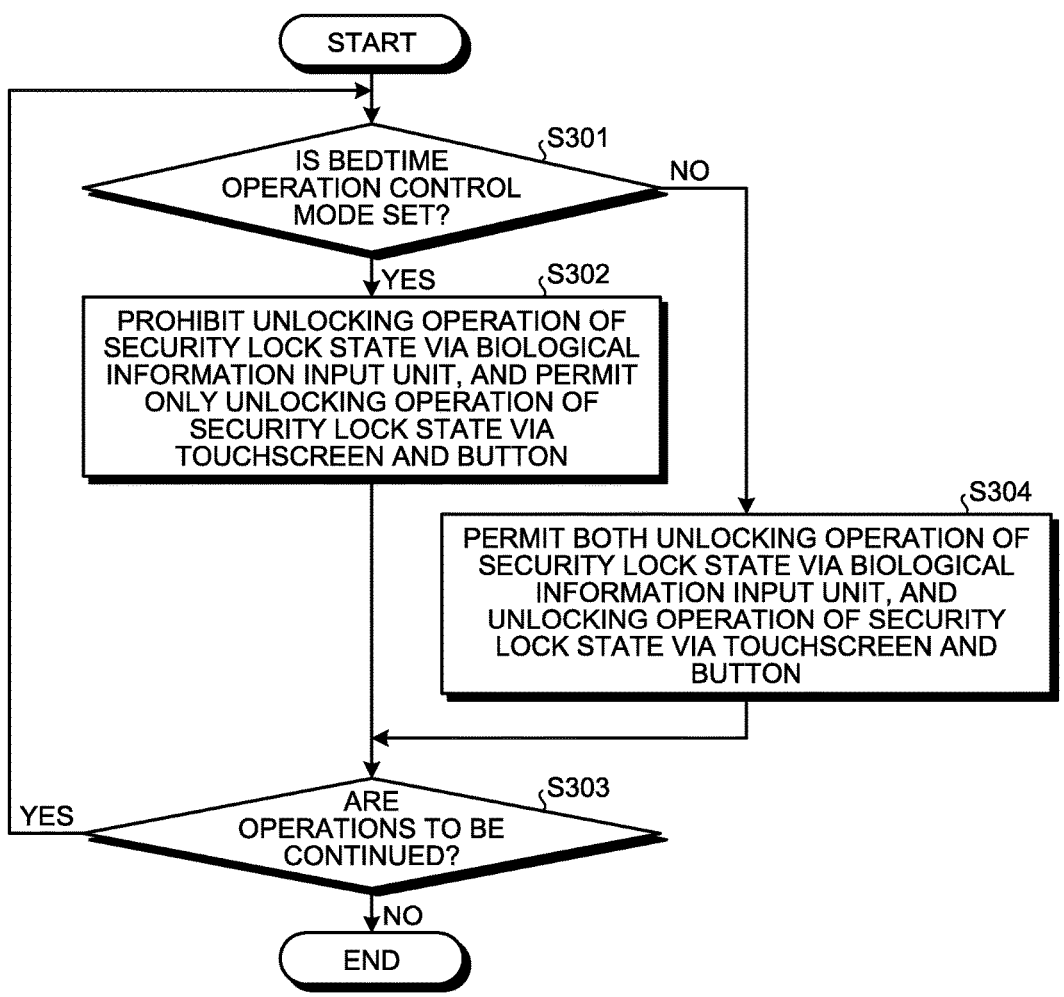
FIG. 4 is a flowchart for explaining an example of the operations performed by the smartphone according to other embodiments.

Explained below with reference to FIG. 4 is an exemplary flow of operations performed by the smartphone 1. FIG. 4 is a flowchart for an example of the operations performed by the smartphone according to other embodiments.

As illustrated in FIG. 4, the controller 10 determines whether or not the bedtime operation control mode has been set (Step S301).

If it is determined that the bedtime operation control mode has been set (Yes at Step S301), then the controller 10 prohibits an unlocking operation of the security lock state via the biological information input unit 16 and permits only an unlocking operation of the security lock state via the touchscreen 2B and the button 3 (Step S302).

Subsequently, the controller 10 determines whether or not to continue with the operations (Step S303).

If it is determined to continue with the operations (Yes at Step S303), then the controller 10 returns to the operation at Step S301.

On the other hand, if it is determined not to continue with the operations (No at Step S303), then the controller 10 ends the operations illustrated in FIG. 4.

Meanwhile, at Step S301, if it is determined that the bedtime operation control mode is not set (No at Step S301), then the controller 10 permits both an unlocking operation of the security lock state via the biological information input unit 16 and an unlocking operation of the security lock state via the touchscreen 2B and the button 3 (Step S304), and returns to the determination performed at Step S303.

As described above, if the bedtime operation control mode is set, the intent behind prohibiting unlocking of the security lock state using the biological information is to avoid a situation in which a third party takes a hand of the user while the user is unaware, and unlocks the security lock state using the fingerprint of the user.

Meanwhile, the operations illustrated in FIG. 4 can be implemented also in the operations illustrated in FIG. 3. In the operations illustrated in FIG. 3, for example, when the user of the own device 1 is moving inside the home, the smartphone 1 permits unlocking of the security lock state using biological information. In the operations illustrated in FIG. 4, if the bedtime operation control mode is set, the smartphone 1 prohibits unlocking of the security lock state using biological information. Thus, for example, the smartphone 1 can either implement the method of unlocking explained with reference to FIG. 3 or implement the method of unlocking explained with reference to FIG. 4 with priority. That is, if the bedtime operation control mode is set, even if the user of the own device is moving inside the home, the smartphone 1 may prohibit unlocking of the security lock state using biological information. On the other hand, when the user of the own device is moving inside the home, even if the bedtime operation control mode is set, the smartphone 1 may permit unlocking of the security lock state using biological information.

The operations illustrated in FIGS. 2 to 4 can be implemented in various other electronic devices, other than the smartphone 1, in which a security lock is provided.

Herein, the technology according to the appended claims is described with reference to the distinguishing embodiments for a complete and clear disclosure. However, the appended claims are not to be thus limited but are to be construed as embodying all modifications and alternative constructions that may occur to one skilled in the art that fairly fall within the basic teaching herein set forth.

What is claimed is:

1. A mobile electronic device comprising:
   an acceleration sensor configured to detect an acceleration value;
   a controller configured to determine, based on the acceleration value, movement state of user of the mobile electronic device;
   a first input unit configured to receive input of information enabling unlocking of a security lock state in which a security lock is effective; and
   a second input unit configured to receive input of biological information enabling unlocking of the security lock state, wherein
   when it is determined based on the acceleration value that the user is not moving, the controller permits both unlocking of the security lock state based on information input via the first input unit and unlocking of the security lock state based on information input via the second input unit,
   when it is determined based on the acceleration value that the user is moving, the controller prohibits unlocking of the security lock state based on information input via the first input unit and permits only unlocking of the security lock state based on information input via the second input unit, and
   wherein the state of the user not moving includes movement of the mobile electronic device as a result of the user handling the mobile electronic device while the user is stationary.

2. The mobile electronic device according to claim 1, wherein the controller determines movement state of the user based on a change pattern of the acceleration value.

3. The mobile electronic device according to claim 1, wherein the first input unit includes at least one of a touchscreen, a numeric keypad, and QWERTY keys.

4. The mobile electronic device according to claim 1, wherein the second input unit detects, as the biological information, any of a face, a fingerprint, an ear print, a vein pattern, an iris, a retina, and a voiceprint.

5. The mobile electronic device according to claim 1, wherein
when it is determined that the user is moving, the controller further determines whether or not current location of the user is a predetermined location,
when current location of the user is a predetermined location, the controller permits both unlocking of the security lock state based on information input via the first input unit and unlocking of the security lock state based on information input via the second input unit, and
when current location of the user is not a predetermined location, the controller prohibits unlocking of the security lock state based on information input via the first input unit and permits only unlocking of the security lock state based on information input via the second input unit.

6. The mobile electronic device according to claim 5, wherein the controller is configured to determine, when the predetermined location is a home, whether the current location of the user points to the home, based on whether a wireless local area network (LAN) router installed in the home is detected.

7. A security control method of a mobile electronic device that includes
an acceleration sensor configured to detect an acceleration value,
a first input unit configured to receive input of information enabling unlocking of a security lock state in which a security lock is effective, and
a second input unit configured to receive input of biological information enabling unlocking of the security lock state,
the security control method comprising the steps of:
determining, based on the acceleration value, movement state of user of the mobile electronic device;
permitting, when it is determined based on the acceleration value that the user is not moving, both unlocking of the security lock state based on information input via the first input unit and unlocking of the security lock state based on information input via the second input unit; and
prohibiting, when it is determined based on the acceleration value that the user is moving, unlocking of the security lock state based on information input via the first input unit and permitting only unlocking of the security lock state based only on information input via the second input unit, wherein
the state of the user not moving includes movement of the mobile electronic device as a result of the user handling the mobile electronic.

8. A non-transitory storage medium that stores thereon a security control code for causing a mobile electronic device including an acceleration sensor configured to detect an acceleration value, a first input unit configured to receive input of information enabling unlocking of a security lock state in which a security lock is effective, and a second input unit configured to receive input of biological information enabling unlocking of the security lock state to execute the steps of:
determining, based on the acceleration value, movement state of user of the mobile electronic device;
permitting, when it is determined based on the acceleration value that the user is not moving, both unlocking of the security lock state based on information input via the first input unit and unlocking of the security lock state based on information input via the second input unit; and
prohibiting, when it is determined based on the acceleration value that the user is moving, unlocking of the security lock state based on information input via the first input unit and permitting only unlocking of the security lock state based only on information input via the second input unit, wherein
the movement state in which the user is not moving is a state in which a location of the mobile electronic device has not substantially changed, and
the movement state in which the user is moving is a state in which a location of the user carrying the mobile electronic device has changed according to time.

9. The non-transitory storage medium according to claim 8, wherein
the movement state in which the user is not moving includes a state in which the mobile electronic device is placed on a stationary object and a halting state in which the user who is carrying the mobile electronic device is halted, and
the movement state in which the user is moving includes a walking state in which the user carrying the mobile electronic device is walking, a running state in which the user carrying the mobile electronic device is running, and a riding state in which the user carrying the mobile electronic device is riding a bicycle, automobile, or train.

* * * * *